United States Patent
Woo et al.

(10) Patent No.: US 9,886,076 B2
(45) Date of Patent: Feb. 6, 2018

(54) USER SCHEDULED PORTABLE DEVICE POWER MANAGEMENT

(71) Applicant: Dell Products, LP, Round Rock, TX (US)

(72) Inventors: Joohyun Woo, Austin, TX (US); Mohammed K. Hijazi, Austin, TX (US); Tera Siddhartha Reddy, Austin, TX (US); Deeder M. Aurongzeb, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 226 days.

(21) Appl. No.: 14/561,060

(22) Filed: Dec. 4, 2014

(65) Prior Publication Data

US 2016/0162006 A1    Jun. 9, 2016

(51) Int. Cl.
*G06F 1/32*        (2006.01)
*G06F 9/50*        (2006.01)

(52) U.S. Cl.
CPC ............ *G06F 1/3212* (2013.01); *G06F 1/329* (2013.01); *G06F 9/5094* (2013.01); *Y02B 60/1292* (2013.01); *Y02B 60/144* (2013.01)

(58) Field of Classification Search
None
See application file for complete search history.

(56) References Cited

U.S. PATENT DOCUMENTS

| 7,363,519 | B2 * | 4/2008 | Liebenow | G06F 1/3203 713/300 |
| 7,742,299 | B2 | 6/2010 | Sauciuc et al. | |
| 2006/0015758 | A1 * | 1/2006 | Yoon | G06F 1/3203 713/300 |
| 2007/0188144 | A1 * | 8/2007 | Hara | G06F 1/3203 320/132 |
| 2008/0201587 | A1 * | 8/2008 | Lee | G06F 1/3203 713/320 |
| 2013/0243030 | A1 | 9/2013 | Mahalingam et al. | |
| 2014/0099978 | A1 | 4/2014 | Egner et al. | |

OTHER PUBLICATIONS

"Global Data Center Cooling Solutions Market," PR Newswire Research and Markets, Dublin, Mar. 19, 2014, http://www.prnewswire.com/news-releases/global-data-center-cooling-solutions-market-250921641.html.

* cited by examiner

*Primary Examiner* — Paul Yanchus, III
(74) *Attorney, Agent, or Firm* — Larson Newman, LLP (57) ABSTRACT

An information handling system includes a processor, a battery management unit and a memory that stores an operating system. The operating system includes instructions that are executable by the processor to obtain a first user selection of necessary applications to be executed on a portable device and to obtain a second user selection of optional applications to be executed on a portable device.

17 Claims, 5 Drawing Sheets

USER SCHEDULED PORTABLE DEVICE POWER MANAGEMENT

FIELD OF THE DISCLOSURE

The present disclosure generally relates to information handling systems, and more particularly relates to portable device power management.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the FIGS. is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
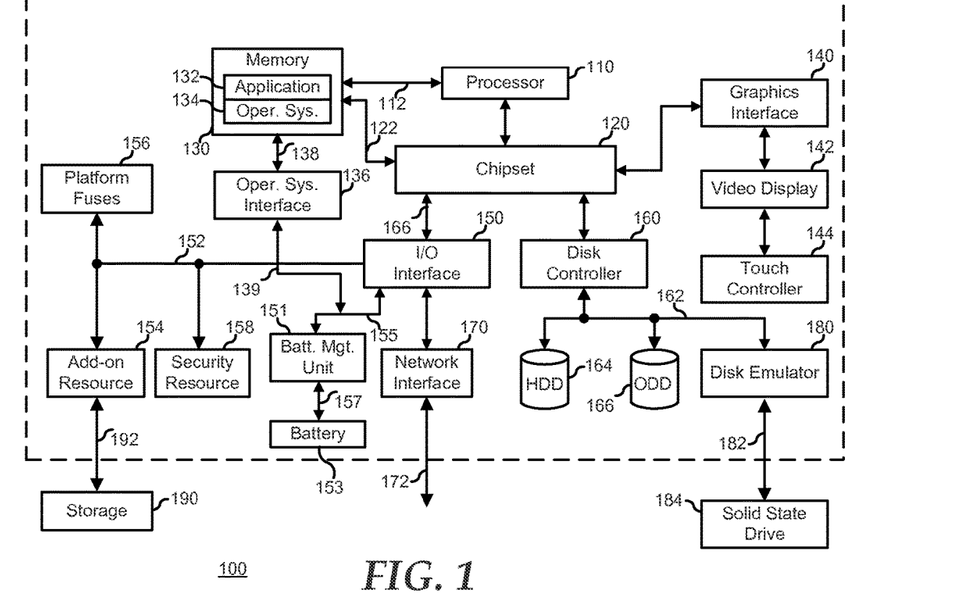
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processor 110, a chipset 120, a memory 130, a graphics interface 140, a disk controller 160, a disk emulator 180, an input/output (I/O) interface 150, and a network interface 170. Processor 110 is connected to chipset 120 via processor interface 112. Processor 110 is connected to memory 130 via memory bus 118. Memory 130 is connected to chipset 120 via a memory bus 122. Graphics interface 140 is connected to chipset 110 via a graphics interface 114, and provides a video display output 146 to a video display 142. Video display 142 is connected to touch controller 144 via touch controller interface 148. In a particular embodiment, information handling system 100 includes separate memories that are dedicated to processor 110 via separate memory interfaces. An example of memory 130 includes random access memory (RAM) such as static RAM (SRAM), dynamic RAM (DRAM), non-volatile RAM (NV-RAM), or the like, read only memory (ROM), another type of memory, or a combination thereof. Memory 130 can store, for example, at least one application 132 and operating system 134. Operating system 134 includes operating system code operable to detect resources within information handling system 100, to provide drivers for the resources, initialize the resources, to access the resources, and to support execution of the at least one application 132. Operating system 134 has access to system elements via an operating system interface 136. Operating system interface 136 is connected to memory 130 via connection 138.

Battery management unit (BMU) 151 is connected to I/O interface 150 via battery management unit interface 155. BMU 151 is connected to battery 153 via connection 157. Operating system interface 136 has access to BMU 151 via connection 139, which is connected from operating system interface 136 to battery management unit interface 155.

Graphics interface 140, disk controller 160, and I/O interface 150 are connected to chipset 120 via interfaces that may be implemented, for example, using a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof.

Disk controller 160 is connected to chipset 120 via connection 116. Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 182 includes a USB interface, an IEEE 1194 (Firewire) interface, a proprietary interface, or a combination thereof. Alternatively, solid-state drive 184 can be disposed within information handling system 100.

I/O interface 150 is connected to chipset 120 via connection 166. I/O interface 150 includes a peripheral interface 152 that connects the I/O interface to an add-on resource 154, to platform fuses 156, and to a security resource 158. Peripheral interface 152 can be the same type of interface as connects graphics interface 140, disk controller 160, and I/O interface 150 to chipset 120, or can be a different type of interface. As such, I/O interface 150 extends the capacity of such an interface when peripheral interface 152 and the I/O channel are of the same type, and the I/O interface translates information from a format suitable to such an interface to a format suitable to the peripheral channel 152 when they are of a different type. Add-on resource 154 can include a data storage system, an additional graphics interface, a network interface card (NIC), a sound/Video processing card, another add-on resource, or a combination thereof. As an example, add-on resource 154 is connected to data storage system 190 via data storage system interface 192. Add-on resource 154 can be on a main circuit board, on separate circuit board or add-in card disposed within information handling system 100, a device that is external to the information handling system, or a combination thereof.

Network interface 170 represents a NIC disposed within information handling system 100, on a main circuit board of the information handling system, integrated onto another component such as chipset 120, in another suitable location, or a combination thereof. Network interface 170 is connected to I/O interface 150 via connection 174. Network interface device 170 includes network channel 172 that provides an interface to devices that are external to information handling system 100. In a particular embodiment, network channel 172 is of a different type than peripheral channel 152 and network interface 170 translates information from a format suitable to the peripheral channel to a format suitable to external devices. An example of network channels 172 includes InfiniBand channels, Fibre Channel channels, Gigabit Ethernet channels, proprietary channel architectures, or a combination thereof. Network channel 172 can be connected to external network resources (not illustrated). The network resource can include another information handling system, a data storage system, another network, a grid management system, another suitable resource, or a combination thereof.

Figure 2:
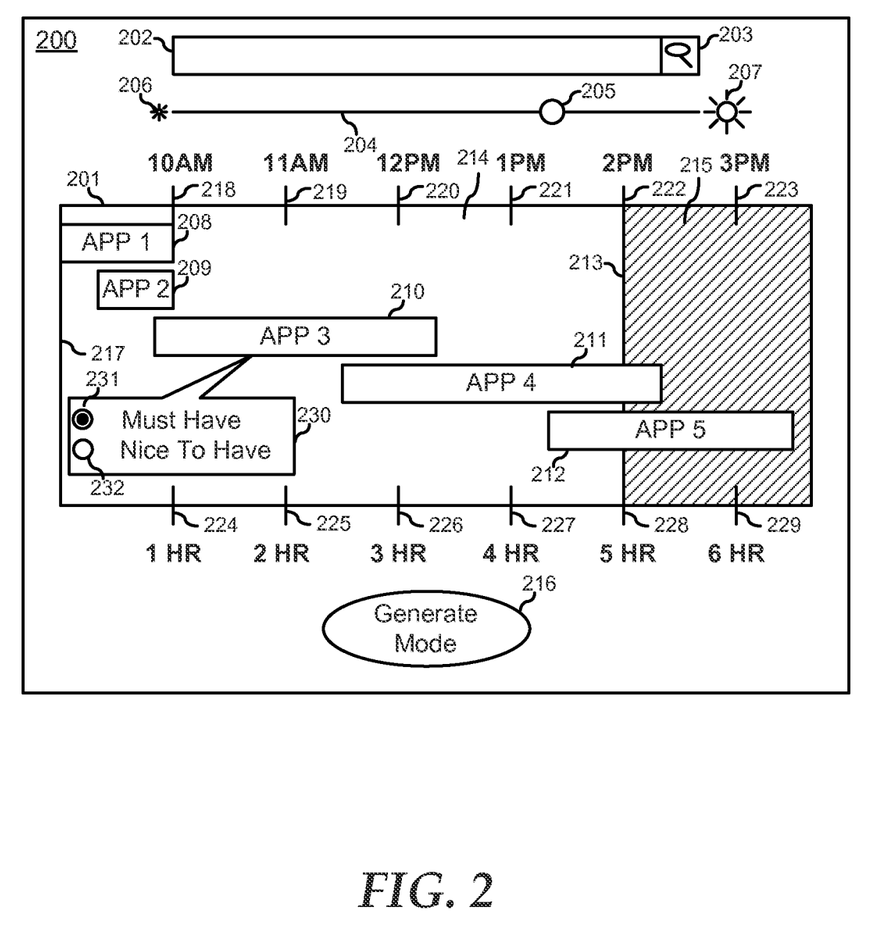
FIG. 2 is a display image diagram illustrating a graphic user interface (GUI) for receiving user selections and displaying configuration information to implement intelligent power management according to an embodiment of the present disclosure.

FIG. 2 is a display image diagram illustrating a graphic user interface (GUI) for receiving user selections and displaying configuration information to implement intelligent power management according to an embodiment of the present disclosure. GUI 200 comprises a multidimensional schedule display 201, an application search bar 202 including a search icon 203, a display brightness control 204, and a mode generation button 216. Multidimensional schedule display 201 displays application temporal bars 208-212 arranged with respect to one axis, for example, vertically, and spanning periods of time with respect to another axis, for example, horizontally. In the illustrated example, a first application temporal bar 208 is shown spanning a time period from a current time 217 to one hour 224 later at time 218 (e.g., 10:00 a.m.). A second application temporal bar 209 is shown spanning a time period from 9:30 a.m. to 10:00 a.m. A third application temporal bar 210 is shown spanning a time period from 9:50 a.m. extending past two hours 225 from the current time at time 219 (e.g., 11:00 a.m.) and three hours 226 from the current time at time 220 (e.g., 12:00 p.m.) to 12:20 p.m. A fourth application temporal bar 211 is shown spanning a time period from 11:30 a.m. extending past three hours 226 from the current time at time 220 (e.g., 12:00 p.m.), four hours 227 from the current time at time 221 (e.g., 1:00 p.m.), and five hours 228 from the current time at time 222 (e.g., 2:00 p.m.) to 2:20 p.m. A fifth application temporal bar 212 is shown spanning a time period from 1:20 p.m. extending past five hours 228 from the current time at time 222 (e.g., 2:00 p.m.) and six hours 229 from the current time at time 223 (e.g., 3:00 p.m.) to 3:30 p.m.

GUI 200 allows user input to select application temporal bars 208-212. The number of application temporal bars 208-212 may be selected by a user and may differ from the five illustrated in the example. The identity of the applications represented by application temporal bars 208-212 may be selected by a user. While the application temporal bars 208-212 are shown as being labeled generically, with designations such as "APP 1," "A. 2," and "APP 3," application temporal bars 208-212 can be labeled with names of specific applications, such as a specific name of a web browser application, a word processing application, a spreadsheet application, a media player application, a graphics application, or any other application which may be executed on the information handling system. One or more application temporal bars may be established for any single application. The temporal beginning and end of one or more application temporal bars for any application may be selected by a user. For example, an application may be scheduled to be executed from a first time to a second time, at which the execution stops, for example, being suspended or terminated, and then to be executed later from a third time to a fourth time. Priorities of applications represented by application temporal bars 208-212 can be selected by a user. For example, menu 230 associated with application temporal bar 210 allows selection of different priorities, such as "must have" priority 231 or "nice to have" priority 232, for the application represented by application temporal bar 210. Application temporal bars 208-212 may be coded with an indicator, such as a color or pattern, to denote a selected priority.

Multidimensional schedule display 201 includes a feasible region 214 and a infeasible region 215 demarcated by temporal power limit line 213, which, in the illustrated example, shows five hours 228 from the current time 217 to be remaining. As temporal power limit line 213, which depicts the duration of remaining power available to power the portable device, is a function of the applications proposed to be executed on the portable device and the durations over which those applications are proposed to be executed, temporal power limit line 213 may move along the time axis as different configurations of applications are proposed. Feasible region 214 indicates a temporal period during which sufficient power is expected to be available for device operation according to the proposed application configuration. Infeasible region 215 indicates a temporal period during which sufficient power is expected not to be available for device operation according to the proposed application configuration. Feasible region 214 and infeasible region 215 may be coded with an indicator, such as a color or pattern, to denote their respective expected feasibility and infeasibility given the available power source, such as battery, of the portable device.

Application search bar 202 can receive user input, such as a name of an application for which to search, and search icon 203 can initiate a search based on the user's interaction. Application search bar 202 can be used to add desired applications to multidimensional schedule display 201. When included in multidimensional schedule display 201, added applications can be included in the determination of the location of temporal power limit line 213.

Display brightness control 204 can be adjusted by a user to control display brightness. Reduced display brightness can be used to extend feasible region 214 by decreasing power consumption attributable to the display. Increased display brightness can facilitate display viewing, especially in bright ambient lighting conditions.

Generate mode button 216 allows a user to initiate generation of a mode based on the parameters of GUI 200, which can include parameters obtained from user input and parameters obtained from contextual information. Modes may be used presently and may be stored for future use.

Figure 3:
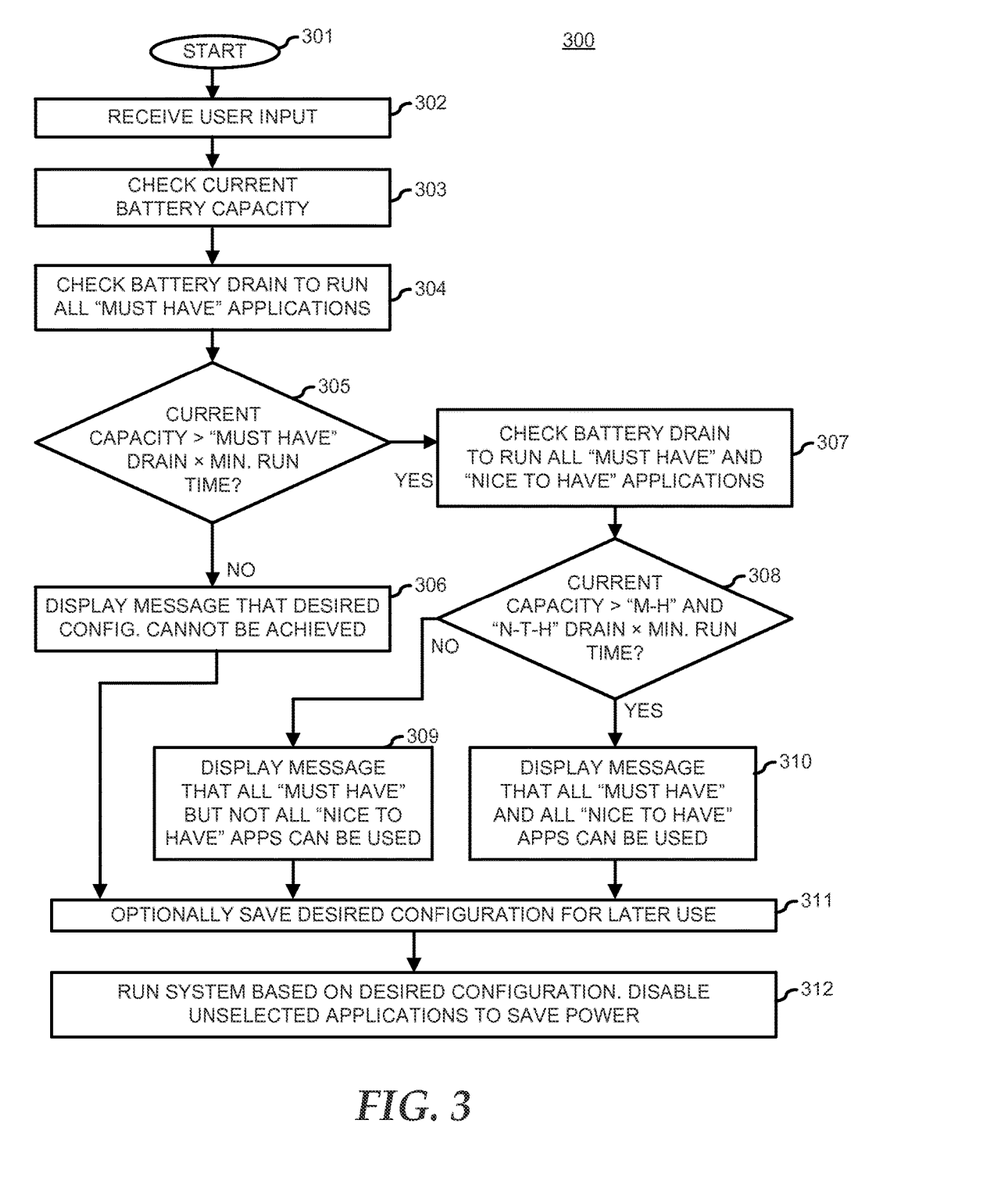
FIG. 3 is a flow diagram illustrating a method of intelligent power management according to an embodiment of the present disclosure.

FIG. 3 is a flow diagram illustrating a method of intelligent power management according to an embodiment of the present disclosure. Method 300 begins at block 301. From block 301, method 300 continues to block 302. In block 302, user input is received. From block 302, method 300 continues to block 303. In block 303, a check of current battery capacity is performed. From block 303, method 300 continues to block 304. In block 304, battery drain is checked with respect to an ability to run all "must have" applications, which are applications a user deems to be necessary. From block 304, method 300 continues to decision block 305. In decision block 305, a decision is made as to whether or not the current battery capacity is greater than the battery drain to be expected by running all "must have" applications multiplied by a minimum run time required of the "must have" applications. If the current battery capacity is not greater than the battery drain to be expected by running all "must have" applications multiplied by the minimum run time required of the "must have" applications, method 300 continues to block 306. In block 306, a message is displayed that the desired configuration cannot be achieved. If an alternative configuration is practical, at least one practical alternative configuration is presented to a user, and any selection of one such practical alternative configuration by the user is received and implemented. As an example, a practical alternative configuration where only the "must have" applications are executed with a display brightness reduced and processor power usage limited can be presented to the user. From block 306, method 300 continues to block 311, which will be described below. If, at decision block 305, the current battery capacity is greater than the battery drain to be expected by running all "must have" applications multiplied by the minimum run time required of the "must have" applications, method 300 continues to block 307. In block 307, battery drain is checked with respect to running all "must have" applications and all "nice to have" applications, which are applications a user deems to be optional. From block 307, method 300 continues to decision block 308. In decision block 308, a decision is made as to whether or not the current battery capacity is greater than a combined battery drain expected from running all "must have" and all "nice to have" applications. If the current battery capacity is not greater than the battery drain to be expected by running all "must have" and all "nice to have" applications multiplied by the minimum run time required of the "must have" and "nice to have" applications, method 300 continues to block 309. In block 309, a message is displayed that all "must have" applications can be ran, but not all "nice to have" applications. If an alternative configuration that would allow all of both the "must have" and the "nice to have" applications to be executed is practical, at least one practical alternative configuration is presented to a user, and any selection of one such practical alternative configuration by the user is received and implemented. As one example, a practical alternative configuration where the "must have" and "nice to have" applications are executed with a display brightness reduced can be presented to the user. As another example, a practical alternative configuration where the "must have" and "nice to have" applications are executed with a processor power usage limited can be presented to the user. From block 309, method 300 continues to block 311, as described below. If, at decision block 308, the current battery capacity is greater than the battery drain to be expected by running all "must have" and all "nice to have" applications multiplied by the minimum ran time required of the "must have" and "nice to have" applications, method 300 continues to block 310. In block 310, a message is displayed that all "must have" and all "nice to have applications can be run. From block 310, method 300 continues to block 311. In block 311, a desired configuration can optionally be saved for later use. As an example, the power management can track a user's calendar or location. When the user's calendar schedule or the user's location is similar to that for which the desired configuration is saved, a recommendation to adopt or an automatic adoption of the saved configuration can be made. From block 311, method 300 continues to block 312. In block 312, the system of the portable device is run based on the desired configuration. Applications which have not been selected to be included in the desired configuration can be disabled to save power.

Figure 4:
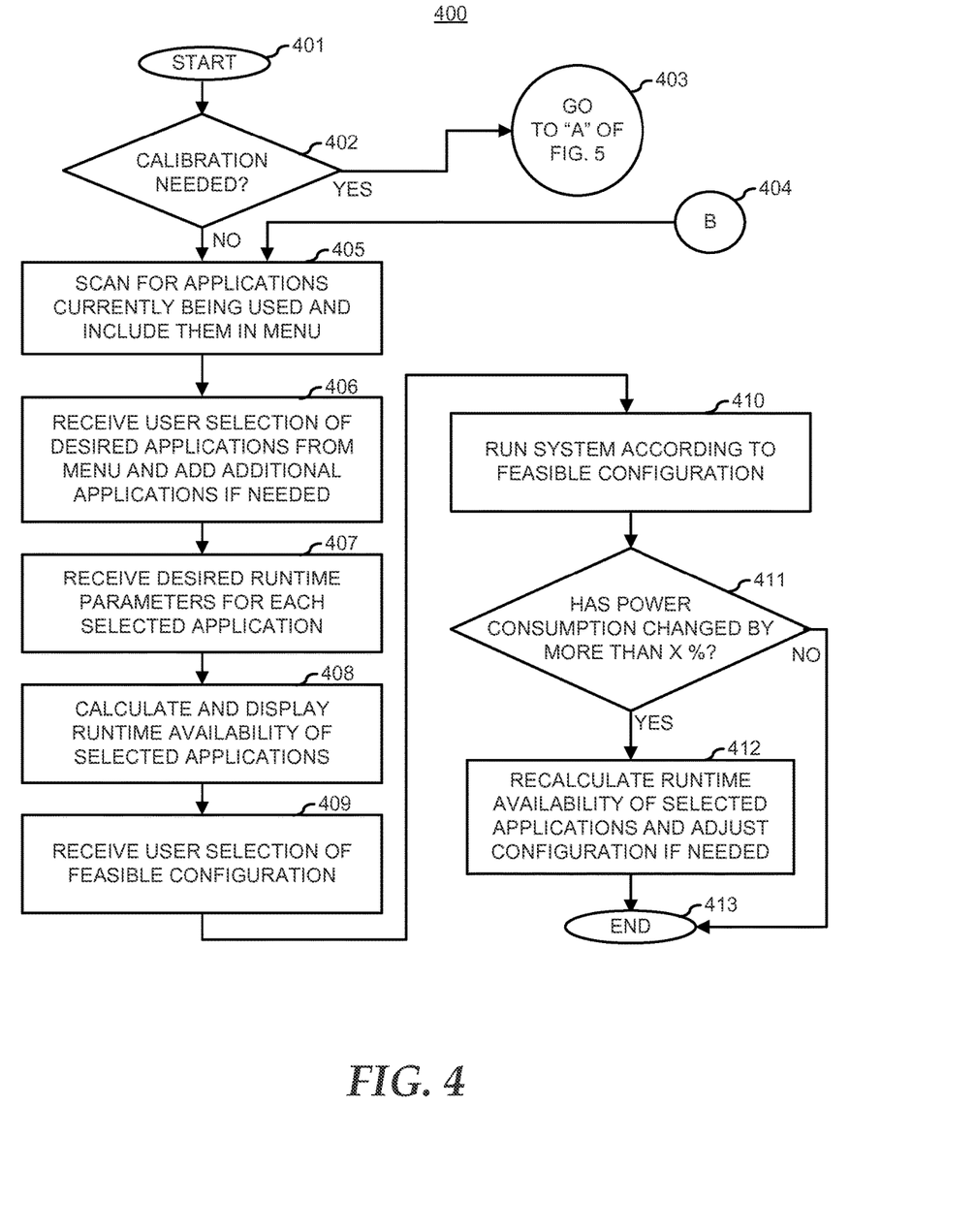
FIG. 4 is a flow diagram illustrating a method of intelligent power management according to an embodiment of the present disclosure.

FIG. 4 is a flow diagram illustrating a method of intelligent power management according to an embodiment of the present disclosure. Method 400 begins in block 401. From block 401, method 400 continues to decision block 402. In decision block 402, a decision is made as to whether or not calibration is needed. If calibration is needed, method 400 continues to transition 403. Transition 403 leads to transition 501, marked "A," of FIG. 5, which will be discussed below with respect to FIG. 5. If calibration is not needed, method 400 continues to block 405. Transition 404, marked "B," from transition 516 of FIG. 5 also leads to block 405. In block 405, a scan for applications currently being used is performed, and such currently used applications are included for user selection, for example, on a menu or in a multidimensional schedule display, such as multidimensional schedule display 201 of FIG. 2. From block 405, method 400 continues to block 406. In block 406, a user selection of desired applications is received. Additional applications can also be added by user selection. From block 406, method 400 continues to block 407. In block 407, desired runtime parameters for each selected application are received. For example, temporal beginnings and ends, priorities, and other attributes, as discussed above with respect to FIG. 2, may be included among the desired runtime parameters. From block 407, method 400 continues to block 408. In block 408, the runtime availability of the selected applications is calculated and displayed. From block 408, method 400 continues to block 409. In block 409, a user selection of a feasible configuration is received. From block 409, method 400 continues to block 410. In block 410, the system of the portable device is am according to the feasible configuration. From block 410, method 400 continues to decision block 411. In decision block 411, a decision is made as to whether or not power consumption has changed by more than a specified amount, such as a percentage. If power consumption has changed by more than the specified amount, method 400 continues to block 412. In block 412, runtime availability of the selected applications is recalculated. If needed, the selected configuration is adjusted to maintain feasibility. From block 412, method 400 continues to block 413, where it ends. If, in decision block 411, power consumption has not changed by more than the specified amount, method 400 continues to block 413, where it ends.

Figure 5:
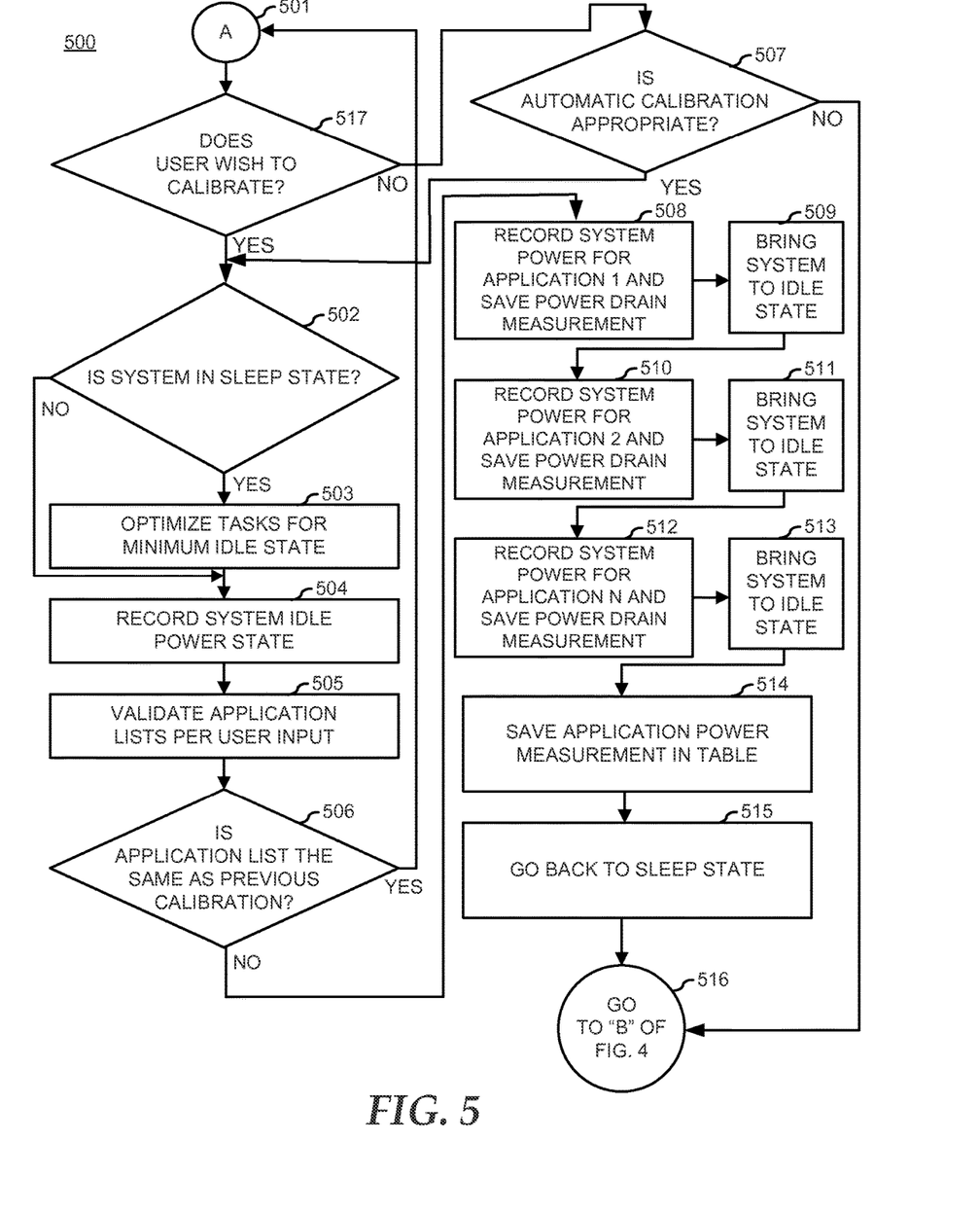
FIG. 5 is a flow diagram illustrating a method of calibration of intelligent power management according to an embodiment of the present disclosure.

FIG. 5 is a flow diagram illustrating a method of calibration of intelligent power management according to an embodiment of the present disclosure. Method 500 begins at transition 501. Method 400 of FIG. 4 can arrive at transition 501 via transition 403 of FIG. 4. Method 500 can arrive at transition 501 via decision block 506, as will be discussed below. From transition 501, method 500 continues to decision block 517. In decision block 517, a decision is made as to whether or not calibration should be performed. As an example, an option is displayed to a user requesting user input as to either calibrate and use applications or not use the applications for which calibration has not been performed. While performing calibration can obtain information useful for power management, deferring calibration can avoid using power to perform the calibration, which can be especially useful when the available energy is limited, for example, when obtaining power from a battery. User input is received and the decision of decision block 517 is made based on the received user input. If the decision is made not to perform the calibration, method 500 continues to decision block 507. In decision block 507, a decision is made whether or not automatic calibration is appropriate. As an example, based on a user's calendar and applications the user has used at different times of the day, the decision may be made that it is appropriate to perform automatic calibration. If the decision is made that automatic calibration is appropriate, method 500 continues to decision block 502. If the decision is made that automatic calibration is not appropriate, method 500 continues to transition 516. Method 500 can transition from transition 516 to transition 404, marked "B," of FIG. 4. If, in decision block 517, the decision is made to perform the calibration, method 500 continues from decision block 517 to decision block 502.

In decision block 502, a decision is made as to whether or not the system of the portable device is in a sleep state. If so, method 500 continues to block 503. In block 503, the optimizing of tasks for a minimum idle state is performed. From block 503, method 500 continues to block 504. If, in decision block 502, the system is not in a sleep state, method 500 continues to block 504. In block 504, the system idle power state is recorded. From block 504, method 500 continues to block 505. In block 505, application lists are validated per user input. From block 505, method 500 continues to decision block 506. In decision block 506, a decision is made as to whether or not the application list is the same as it was for a previous calibration. If so, method 500 returns to transition 501. If not, method 500 continues to block 508. In block 508, system power for a first, application is recorded and a power drain measurement is saved. From block 508, method 500 continues to block 509. In block 509, the system is brought to an idle state. From block 509, method 500 continues to block 510. In block 510, system power for a second application is recorded and a power drain measurement is saved. From block 510, method 500 continues to block 511. In block 511, the system is brought to an idle state. From block 511, method 500 continues to block 512. In block 512, system power for an nth application is recorded and a power drain measurement is saved. The nth application may correspond to any number of an application, and recording of system power, saving of power drain measurement, and bringing the system to an idle state may be performed for any intervening number of applications, for example, between block 511 and block 512. From block 512, method 500 continues to block 513. In block 513, the system is brought to an idle state. From block 513, method 500 continues to block 514. In block 514, an application power measurement is saved in a table. From block 514, method 500 continues to block 515. In block 515, the portable device is placed back into a sleep state. From block 515, method 500 continues to transition 516. Method 500 can transition from transition 516 to transition 404, marked "B," of FIG. 4.

In accordance with at least one embodiment, per-user per-application power usage tracking can be implemented as an optional user-selectable part of the method of calibration of FIG. 5. For example, preceding decision block 502, a decision block may be introduced to decide whether a user wishes to perform a user-specific calibration or to use generic calibration information. Such a decision may be obtained, for example, by prompting a user or by using a stored preference previously selected by the user (for which a default selection value may exist prior to any selection by the user). Generic calibration information may be obtained, for example, by using calibration information obtained from most recent user-specific or user-non-specific calibrations of the same application, from an average of user-specific or user-non-specific calibrations of the same application, from a median of user-specific or user-non-specific calibrations of the same application, from a time-weighted average of user-specific or user-non-specific calibration s of the same application, from a time weighting of a median of user-specific or user-non-specific calibrations of the same application, or from some other statistical measure of user-specific or user-non-specific calibrations. Use of generic calibration information may be selected, for example, to save the power that would otherwise be used to perform a user-specific calibration for the current user. In the event the decision is made to perform a user-specific calibration, the subsequent blocks of FIG. 5 can be performed with respect to a particular user's usage of applications. For example, if the particular user uses a particular application in a manner that uses less power or more power than other users, the particular attributes of the particular user's influence on power usage during use of the particular application can be determined, and the user-specific application-specific calibration information can be obtained to reflect the particular user's use of the particular application, as opposed to other user's use of the particular application. Once the user-specific application-specific calibration information is obtained, the saving performed in block 504 can save the user-specific application-specific calibration information as being specific to the particular user. Accordingly, in the future, the user's specific calibration information can be retrieved and used personalize the future runtime availability calculations for that particular user.

In accordance with at least one embodiment, a user can be freed of worrying about a battery of a portable device running out before the user finishes necessary tasks. For example, a power management subsystem can receive from a user a specification of a minimum amount of time that the portable device needs to be operational and prioritizations of different software applications the user wants to use. With this user input, the power management subsystem of the portable device can enable the user to choose among different options to achieve realistic user performance goals for using the portable device.

In accordance with at least one embodiment, a method comprises receiving from a user a specification of a minimum amount of time that the system of the portable device needs to remain operational, receiving from the user identification and prioritization of critical applications to be run on the system during the operational time of the portable device, receiving from the user identification and prioritization of additional applications that the user would like the system to run if possible, providing feasible options of application configurations over the operational time, and receiving user selection of a desired feasible option from the user. The power management subsystem can also disable applications not selected by the user so that power will not be wasted running unnecessary applications.

In accordance with at least one embodiment, the power management subsystem enables a user to check the tradeoffs and opportunity costs of running different applications subject to the finite power limitations of, for example, a battery of a portable device. In accordance with at least one embodiment, the power management subsystem calibrates battery drain and analyzes whether a selected user mode can be run by the portable device for an operational time for which the battery, in its state of charge, is expected to be able to sustain operation of the portable device. If not, the power management subsystem provides options the user may select to reach a realistic performance goal. In accordance with at least one embodiment, the power management subsystem creates power plans to optimize battery usage and allows such power plans to be saved for future use. In accordance with at least on embodiment, the power management subsystem enables the user to decide how the battery capacity, which may be expressed as watt hours (Wh), will be used. The power management subsystem receives the user selections of the applications, for which the power management subsystem performs calibration of specific or averaged power W used by each application, and the users selections of the amounts of time (e.g., in hours) each application is expected to be used. The power management subsystem then determines if the user selections specify a realistic performance goal in view of the available battery capacity or not. If not, the power management subsystem provides options the user can select to specify applications and usage times that are compatible with realistic performance goals, where realistic performance goals are performance goals for which adequate battery capacity is available to allow the portable device to meet the goals.

In accordance with at least one embodiment, a method comprises obtaining a first user selection of necessary applications to be executed on a portable device, obtaining a second user selection of optional applications to be executed on the portable device, obtaining a third user selection of a desired operational time of the portable device, determining a current battery capacity of the portable device, determining whether the current battery capacity is sufficient to allow the portable device to execute the necessary applications and the optional applications and to remain operational for the desired operational time, and, when the current battery capacity is sufficient, configuring the portable device to operate according to the first and second user selections. In accordance with at least one embodiment, the method further comprises determining whether the current battery capacity is sufficient to allow the portable device to execute the necessary applications but not all of the optional applications and to remain operational for the desired operational time and, when the current battery capacity is sufficient to allow the portable device to execute the necessary applications but not all of the optional applications, configuring the portable device to operate according to the first user selection. In accordance with at least one embodiment, the method further comprises scanning for currently used applications and providing representations of the currently used applications from which the first user selection and the second user selection are to be made. In accordance with at least one embodiment, the method further comprises receiving user search input specifying an unrepresented application, searching for power usage information pertaining to the unrepresented application, and adding the unrepresented application to one of the first user selection and the second user selection. In accordance with at least one embodiment, the method further comprises performing calibration to establish power usage information of the necessary applications and the optional applications. The determining whether the current battery capacity is sufficient to allow the portable device to execute the necessary applications and the optional applications and to remain operational for the desired operational time utilizes the power usage information. In accordance with at least one embodiment, the method further comprises storing a configuration for future configuring of the portable device to operate according to the first and second user selections. In accordance with at least one embodiment, the method further comprises determining if power consumption of the portable device has changed more than a specified amount and, when the power consumption of the portable device has changed more than the specified amount, reconfiguring the portable device to operate according to a revised configuration of applications selected from the necessary applications and the optional applications.

In accordance with at least one embodiment, an information handling system comprises a processor, a battery management unit, and a memory for storing an operating system. The operating system comprises instructions executable by the processor to obtain a first user selection of necessary applications to be executed on a portable device, to obtain a second user selection of optional applications to be executed on the portable device, to obtain a third user selection of a desired operational time of the portable device, to cause the battery management unit to determine a current battery capacity of the portable device; to determine whether the current battery capacity is sufficient to allow the portable device to execute the necessary applications and the optional applications and to remain operational for the desired operational time, and, when the current battery capacity is sufficient, to configure the portable device to operate according to the first and second user selections. In accordance with at least one embodiment, the operating system comprises further instructions executable by the processor to cause the battery management unit to determine whether the current battery capacity is sufficient to allow the portable device to execute the necessary applications but not all of the optional applications and to remain operational for the desired operational time, and, when the current battery capacity is sufficient to allow the portable device to execute the necessary applications but not all of the optional applications, to configure the portable device to operate according to the first user selection. In accordance with at least one embodiment, the operating system comprises further instructions executable by the processor to scan for currently used applications, and to provide representations of the currently used applications from which the first user selection and the second user selection are to be made, in accordance with at least one embodiment, the operating system comprises further instructions executable by the processor to receive user search input specifying an unrepresented application, to search for power usage information pertaining to the unrepresented application, and to add the unrepresented application to one of the first user selection and the second user selection. In accordance with at least one embodiment, the operating system comprises further instructions executable by the processor to perform calibration to establish power usage information of the necessary applications and the optional applications, wherein the determining whether the current battery capacity is sufficient to allow the portable device to execute the necessary applications and the optional applications and to remain operational for the desired operational time utilizes the power usage information. In accordance with at least one embodiment, the operating system comprises further instructions executable by the processor to store a configuration for future configuring of the portable device to operate according to the first and second user selections. In accordance with at least one embodiment, the operating system comprises further instructions executable by the processor to determine if power consumption of the portable device has changed more than a specified amount, and, when the power consumption of the portable device has changed more than the specified amount, to reconfigure the portable device to operate according to a revised configuration of applications selected from the necessary applications and the optional applications.

In accordance with at least one embodiment, an article of manufacture comprises a nontransitory storage medium storing instructions executable to cause a processor to obtain a first user selection of necessary applications to be executed on a portable device, to obtain a second user selection of optional applications to be executed on the portable device, to obtain a third user selection of a desired operational time of the portable device, to determine a current battery capacity of the portable device, to determine whether the current battery capacity is sufficient to allow the portable device to execute the necessary applications and the optional applications and to remain operational for the desired operational time, and, when the current battery capacity is sufficient, to configure the portable device to operate according to the first and second user selections. In accordance with at least one embodiment, the nontransitory storage medium stores further instructions to cause the processor to determine whether the current battery capacity is sufficient to allow the portable device to execute the necessary applications but not all of the optional applications and to remain operational for the desired operational time, and, when the current battery capacity is sufficient to allow the portable device to execute the necessary applications but not all of the optional applications, to configure the portable device to operate according to the first user selection. In accordance with at least one embodiment, the nontransitory storage medium stores further instructions to cause the processor to scan for currently used applications, and to provide representations of the currently used applications from which the first user selection and the second user selection are to be made. In accordance with at least one embodiment, the nontransitory storage medium stores further instructions to cause the processor to receive a user search input specifying an unrepresented application, to search for power usage information pertaining to the unrepresented application, and to add the unrepresented application to one of the first user selection and the second user selection. In accordance with at least one embodiment, the nontransitory storage medium stores further instructions to cause the processor to perform calibration to establish power usage information of the necessary applications and the optional applications, wherein the determining whether the current battery capacity is sufficient to allow the portable device to execute the necessary applications and the optional applications and to remain operational for the desired operational time utilizes the power usage information. In accordance with at least one embodiment, the nontransitory storage medium stores further instructions to cause the processor to determine if power consumption of the portable device has changed more than a specified amount, and, when the power consumption of the portable device has changed more than the specified amount, to reconfigure the portable device to operate according to a revised configuration of applications selected from the necessary applications and the optional applications.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    presenting, to a user of a portable device, a schedule display including a list of applications;
    obtaining a first user selection from the list of applications of necessary applications to be executed on the portable device, wherein the first user selection includes a desired operational interval for each necessary application;
    obtaining a second user selection from the list of applications of optional applications to be executed on the portable device, wherein the second user selection includes a desired operational interval for each optional application;
    obtaining a third user selection of a desired operational time of the portable device;
    determining a current battery capacity of the portable device;
    determining whether the current battery capacity is sufficient to allow the portable device to execute the necessary applications and the optional applications and to remain operational for the desired operational time;
    when the current battery capacity is sufficient, configuring the portable device to operate according to the first and second user selections; and
    causing a calibration to be performed to establish power usage information of the necessary applications and the optional applications, wherein the determining whether the current battery capacity is sufficient utilizes the power usage information, and wherein calibration includes optimizing tasks, placing a processor into a minimum idle state, recording a system idle state power, executing a calibration application on the processor, recording system power for the calibration application, and placing the processor into the minimum idle state.

2. The method of claim 1 further comprising:
    determining whether the current battery capacity is sufficient to allow the portable device to execute the necessary applications but not all of the optional applications and to remain operational for the desired operational time; and
    when the current battery capacity is sufficient to allow the portable device to execute the necessary applications but not all of the optional applications, configuring the portable device to operate according to the first user selection.

3. The method of claim 1 further comprising:
    scanning for currently used applications; and
    providing representations of the currently used applications from which the first user selection and the second user selection are to be made.

4. The method of claim 3 further comprising:
receiving user search input specifying an unrepresented application;
searching for power usage information pertaining to the unrepresented application; and
adding the unrepresented application to one of the first user selection and the second user selection.

5. The method of claim 1 further comprising:
performing calibration to establish power usage information of the necessary applications and the optional applications, wherein the determining whether the current battery capacity is sufficient to allow the portable device to execute the necessary applications and the optional applications and to remain operational for the desired operational time utilizes the power usage information.

6. The method of claim 1 further comprising:
storing a configuration for future configuring of the portable device to operate according to the first and second user selections.

7. The method of claim 1 further comprising:
determining if power consumption of the portable device has changed more than a specified amount; and
when the power consumption of the portable device has changed more than the specified amount, reconfiguring the portable device to operate according to a revised configuration of applications selected from the necessary applications and the optional applications.

8. An information handling system comprising:
a processor;
a battery management unit; and
a memory for storing an operating system, the operating system comprising instructions executable by the processor to obtain a first user selection of necessary applications to be executed on a portable device, to obtain a second user selection of optional applications to be executed on the portable device, to obtain a third user selection of a desired operational time of the portable device, to cause the battery management unit to determine a current battery capacity of the portable device, to determine whether the current battery capacity is sufficient to allow the portable device to execute the necessary applications and the optional applications and to remain operational for the desired operational time, when the current battery capacity is sufficient to configure the portable device to operate according to the first and second user selections, to determine whether the current battery capacity is sufficient to allow the portable device to execute the necessary applications but not all of the optional applications and to remain operational for the desired operational time, when the current battery capacity is sufficient to allow the portable device to execute the necessary applications but not all of the optional applications, to configure the portable device to operate according to the first user selection, to determine if power consumption of the portable device has changed more than a specified non-zero amount, when the power consumption of the portable device has changed more than the specified non-zero amount, to reconfigure the portable device to operate according to a revised configuration of applications selected from the necessary applications and the optional applications, and to cause the processor to perform calibration to establish power usage information of the necessary applications and the optional applications, wherein the determining whether the current battery capacity is sufficient utilizes the power usage information, and wherein the calibration includes optimizing tasks, placing the processor into a minimum idle state, recording system idle state power, executing a calibration application on the processor, recording system power for the calibration application, and placing the processor into the minimum idle state.

9. The information handling system of claim 8 wherein the operating system comprises further instructions executable by the processor to scan for currently used applications, and to provide representations of the currently used applications from which the first user selection and the second user selection are to be made.

10. The information handling system of claim 9 wherein the operating system comprises further instructions executable by the processor to receive user search input specifying an unrepresented application, to search for power usage information pertaining to the unrepresented application, and to add the unrepresented application to one of the first user selection and the second user selection.

11. The information handling system of claim 8 wherein the operating system comprises further instructions executable by the processor to perform calibration to establish power usage information of the necessary applications and the optional applications, wherein the determining whether the current battery capacity is sufficient to allow the portable device to execute the necessary applications and the optional applications and to remain operational for the desired operational time utilizes the power usage information.

12. The information handling system of claim 8 wherein the operating system comprises further instructions executable by the processor to store a configuration for future configuring of the portable device to operate according to the first and second user selections.

13. An article of manufacture comprising a nontransitory storage medium storing instructions executable to cause a processor to obtain a first user selection of necessary applications to be executed on a portable device, to obtain a second user selection of optional applications to be executed on the portable device, to obtain a third user selection of a desired operational time of the portable device, to determine a current battery capacity of the portable device, to determine whether the current battery capacity is sufficient to allow the portable device to execute the necessary applications and the optional applications and to remain operational for the desired operational time, and, when the current battery capacity is sufficient, to configure the portable device to operate according to the first and second user selections, to cause the processor to perform calibration to establish power usage information of the necessary applications and the optional applications, wherein the determining whether the current battery capacity is sufficient utilizes the power usage information, and wherein the calibration includes optimizing tasks, placing the processor into a minimum idle state, recording system idle state power, executing a calibration application on the processor, recording system power for the calibration application, and placing the processor into the minimum idle state.

14. The article of manufacture of claim 13 wherein the nontransitory storage medium stores further instructions to cause the processor to determine whether the current battery capacity is sufficient to allow the portable device to execute the necessary applications but not all of the optional applications and to remain operational for the desired operational time, and, when the current battery capacity is sufficient to allow the portable device to execute the necessary applications but not all of the optional applications, to configure the portable device to operate according to the first user selection.

15. The article of manufacture of claim 13 wherein the nontransitory storage medium stores further instructions to cause the processor to scan for currently used applications, and to provide representations of the currently used applications from which the first user selection and the second user selection are to be made.

16. The article of manufacture of claim 15 wherein the nontransitory storage medium stores further instructions to cause the processor to receive a user search input specifying an unrepresented application, to search for power usage information pertaining to the unrepresented application, and to add the unrepresented application to one of the first user selection and the second user selection.

17. The article of manufacture of claim 13 wherein the nontransitory storage medium stores further instructions to cause the processor to determine if power consumption of the portable device has changed more than a specified amount, and, when the power consumption of the portable device has changed more than the specified amount, to reconfigure the portable device to operate according to a revised configuration of applications selected from the necessary applications and the optional applications.

\* \* \* \* \*